(12) United States Patent
Young (10) Patent No.: US 7,086,113 B2
(45) Date of Patent: Aug. 8, 2006

(54) SEAMLESS PIPELINE SPHERE AND METHOD OF MANUFACTURE

(75) Inventor: William Bradley Young, Sedgwick, KS (US)

(73) Assignee: Meter Engineers, Inc., Maize, KS (US)

( * ) Notice: Subject to any disclaimer, the term of this patent is extended or adjusted under 35 U.S.C. 154(b) by 30 days.

(21) Appl. No.: 10/442,450

(22) Filed: May 21, 2003

(65) Prior Publication Data
US 2004/0231701 A1 Nov. 25, 2004

(51) Int. Cl.
*B08B 9/053* (2006.01)
*E03B 1/00* (2006.01)

(52) U.S. Cl. ................... 15/104.061; 73/1.18
(58) Field of Classification Search .............. 15/3.5, 15/104.061; 73/1.18
See application file for complete search history.

(56) References Cited

U.S. PATENT DOCUMENTS

| | | | | |
|---|---|---|---|---|
| 2,745,231 A | * | 5/1956 | Prince | 451/36 |
| 2,951,255 A | * | 9/1960 | Ver Nooy | 15/104.061 |
| 3,011,197 A | * | 12/1961 | Nehse et al. | 15/104.061 |
| 3,890,665 A | * | 6/1975 | Richardson | 15/104.061 |
| 5,105,498 A | * | 4/1992 | Dinkelacker | 15/104.061 |
| 6,272,713 B1 | * | 8/2001 | Lotwin | 15/104.061 |
| 6,500,271 B1 | * | 12/2002 | Moore et al. | 134/8 |

FOREIGN PATENT DOCUMENTS

| | | | |
|---|---|---|---|
| GB | 2 021 480 | * | 12/1979 |
| GB | 2 217 423 | * | 10/1989 |

OTHER PUBLICATIONS

Commercial product believed to be on sale at least 1 year prior to May 21, 2003. Product shown on attached Internet excerpt for S.U.N. Engineering, Inc. Super Sphere.

* cited by examiner

*Primary Examiner*—Randall Chin
(74) *Attorney, Agent, or Firm*—Stinson Morrison Hecker LLP (57) ABSTRACT

The invention is generally directed to a pipeline sphere, and more specifically a seamless pipeline sphere wherein said sphere presents a flexible, seamless outer layer surrounding an inflatable inner bladder portion which itself defines a hollow chamber. The outer layer and the inner bladder portion contain apertures which are aligned to form a channel connecting the hollow chamber to the outside environment. A weighted material may be added to the pipeline sphere, if desired.

7 Claims, 4 Drawing Sheets

SEAMLESS PIPELINE SPHERE AND METHOD OF MANUFACTURE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention is generally directed to pipeline sphere assemblies and, more specifically, to a seamless pipeline sphere assembly for use in a pipeline system, particularly for a meter-proving system, for product separation, or for line evacuation.

2. Description of Related Art

Pipeline spheres are commonly used in the pipeline industry for both meter proving and for product separation as well as for line evacuation, among other things. Meter proving is an activity connected with the sale of liquid product delivered through a pipeline. Pipeline meters are not entirely accurate. As such, a meter proving system is needed to measure the flow of a known volume of liquid product over a known distance in order to determine a correction factor by which the measurement must be adjusted. While different types of systems are known, a meter proving system generally comprises a length of pipeline, two detection switches, a sphere, and a launcher. The sphere is launched into the pipeline section and strikes the detection switches. A counter begins counting pulses from the meter when the first switch is activated and stops when the second switch is activated. By comparing the pulses from the meter with the known volume of the meter prover a correction factor can be determined. It is necessary to prove meters by repeating this test within a limited number of series and obtaining the same or similar measurement.

In order to properly function as a meter proving sphere, the sphere must be able to maintain its spherical shape as well as its integrity in both turbulent and non-turbulent pipelines. The sphere should also be sizable to the particular size of the pipeline in order to properly seal.

The use of pipeline spheres in product separation entails placing a sphere into the pipeline between two separate products. It is necessary that the sphere retain its spherical shape and integrity as well as be sized properly to fit the pipeline such that the products are adequately separated.

The use of pipeline spheres in line evacuation is typically employed when a line is shut down. The pipeline sphere is placed in the pipeline and pushed through the pipeline by nitrogen which is pumped behind the pipeline sphere. This action pushes any remaining product into a tank and out of the pipeline.

Traditionally, pipeline spheres have been constructed using two separate pieces, or halves, of a sphere. The sphere halves are traditionally molded separately and then bonded together. Unfortunately, the seam between the two sphere halves creates a line of weakness. This seam encourages the sphere to warp into an egg-shape (i.e. to go out of round). When a pipeline sphere goes out of round, it can no longer function properly within a pipeline. The pressure inside the sphere may also leak out and the sphere will no longer seal in the pipeline. Additionally, because of the warped shape, the sphere may become lodged within the pipeline. In meter proving systems, an out of round sphere will not launch properly and also hampers the repeatability necessary for meter proving. The warping of the sphere additionally causes the seam to fail, again resulting in a pipeline sphere that is no longer functional. Pipeline spheres are costly to change or replace. Additionally, if a sphere ruptures, it may damage the pipeline or the product contained in the pipeline.

Because of turbulence encountered inside pipelines, it is sometimes desirable to have a weighted pipeline sphere in order to stabilize the sphere within the pipeline. Non-weighted spheres are too buoyant for turbulent pipelines. Although it is known to weigh down pipeline spheres, such weight has been added by pouring lead shot into a cavity within the sphere. Unfortunately, when the sphere cracks or the seam fails, the lead shot pours into the prover which can damage the prover coating and damage the meter, pump and other measurement equipment.

BRIEF SUMMARY OF THE INVENTION

The invention is generally directed to a pipeline sphere, and more specifically to a seamless pipeline sphere. It should be noted that as used herein, the terminology "pipeline sphere" is intended to encompass all types of spheres that are used internally of a pipeline, including e.g., and without limitation, spheres for product separation, spheres for line evacuation and spheres for meter proving. The sphere comprises an inflatable inner bladder defining a hollow chamber therein. The inner bladder further comprises an access opening through the wall of the inner bladder. The inner bladder may be made of two separate halves which are bonded together. Surrounding the inner bladder is a flexible, seamless outer layer which also comprises an aperture that is aligned with the opening of the inner bladder such that there is a continuous channel connecting the hollow chamber to the outside environment. A fill valve assembly may be inserted into the continuous channel such that the sphere may be appropriately sized and thus retain its integrity. During the casting process, lead shot may also be added to the inner bladder in order to provide a weighted sphere.

The pipeline sphere of the present invention has the advantage of presenting a seamless outer layer such that there is no line of weakness as with seamed spheres. As such, the pipeline sphere of the present invention maintains round and does not warp into an egg-like shape. Because of the seamless structure of the outer layer, the sphere also will not easily rupture and is, thus, more durable, resulting in a reduced need to replace the sphere. The bonding of a weighted material into the inner bladder of the sphere further adds to its durability in that the weighted material is prevented from spilling out into the pipeline. The pipeline sphere of the present invention is also individually sizable by the purchaser in order to properly fit the size of the pipeline in which the sphere will be utilized. All of these advantages serve to provide a pipeline sphere that is extremely durable and cost-efficient.

Other advantages of the invention will in part be obvious and will in part be apparent from the specification.

DETAILED DESCRIPTION OF PREFERRED EMBODIMENT

Figure 1:
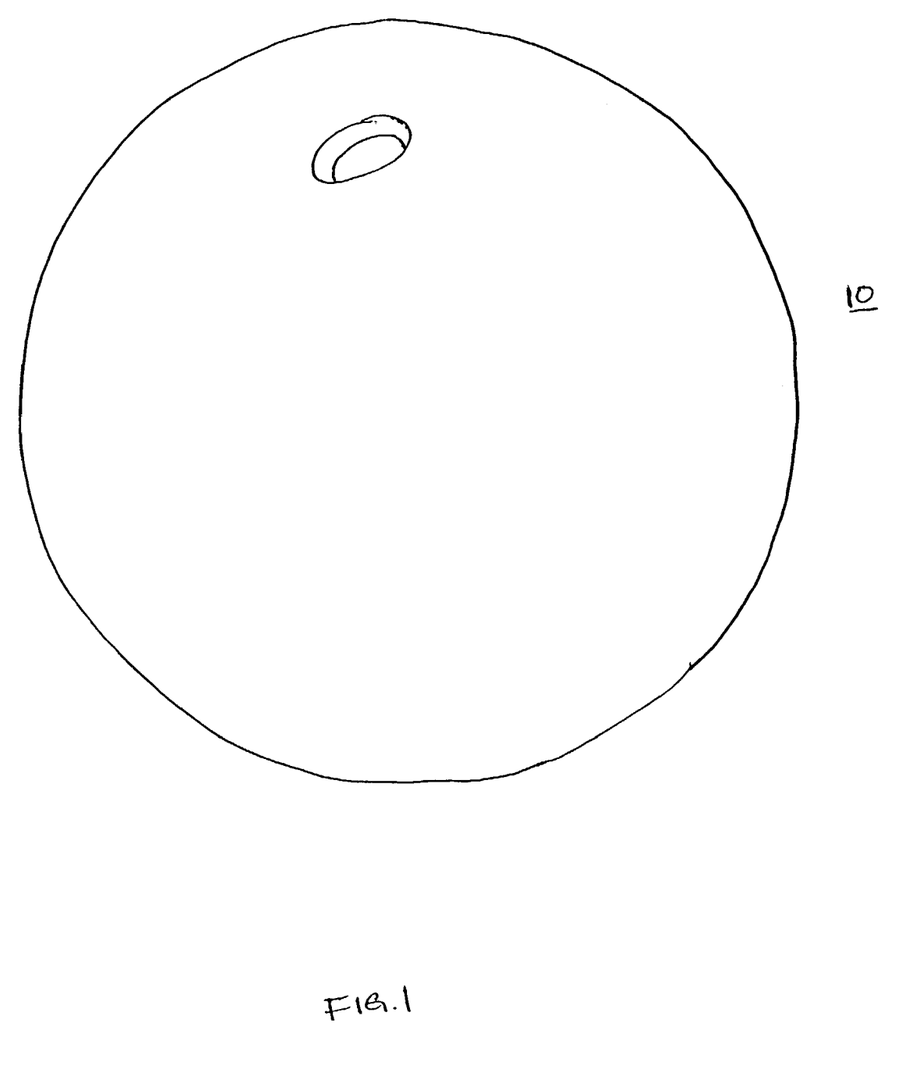
FIG. 1 is a perspective view of a pipeline sphere of the present invention.
Figure 2:
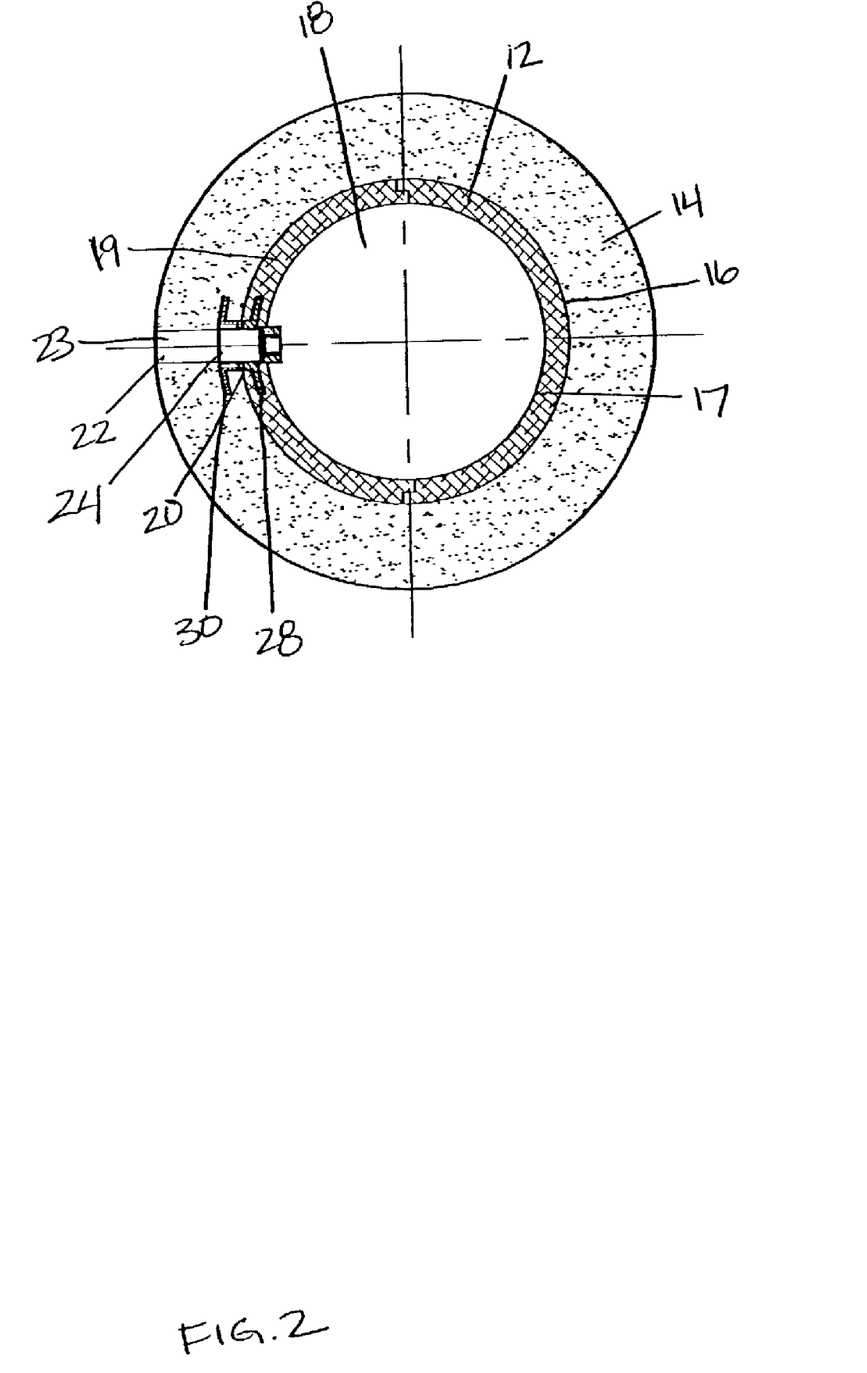
FIG. 2 is a cross sectional view of a first embodiment of the pipeline sphere of the present invention depicted in FIG. 1, having one opening therethrough for receiving a fill valve element.
Figure 3:
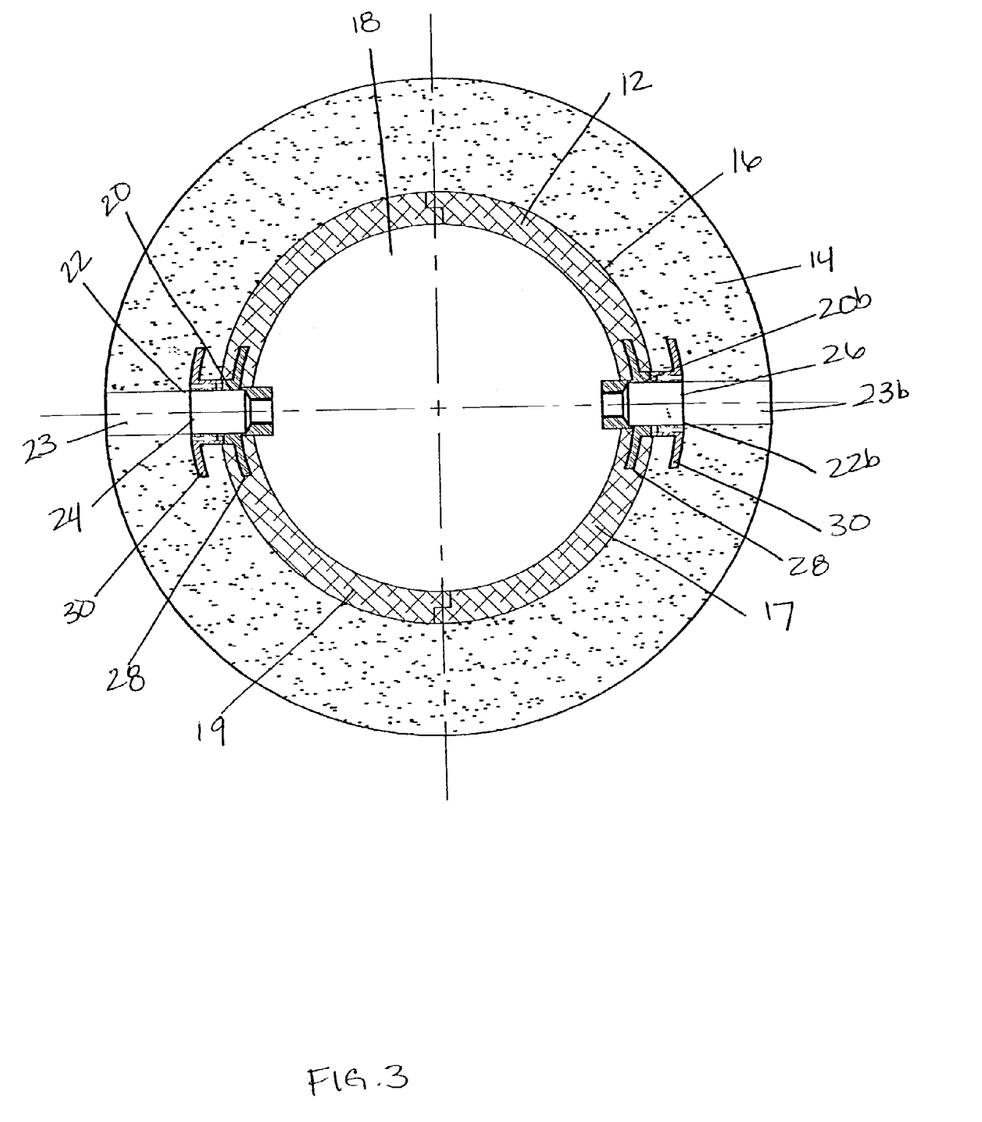
FIG. 3 is a cross sectional view of a second embodiment of the pipeline sphere of the present invention, having two openings therethrough for receiving fill valve elements.

Referring first to FIG. 1, there is shown a first embodiment of the pipeline sphere of the present invention. The exterior of the pipeline sphere 10 is a unitary piece, having no seams. As shown in FIGS. 2 and 3, pipeline sphere 10 comprises inner bladder 12 and outer layer 14. Inner bladder 12 is generally spherically shaped and has a peripheral wall 16. Inner bladder 12 further defines a hollow chamber 18 that is generally spherical in shape. Chamber 18 serves to assist in allowing inner bladder 12 to be inflated by providing a cavity for introduction of a mixture, such as an antifreeze-water mixture, to allow for proper sizing of pipeline sphere 10. Inner bladder 12 further comprises access opening 20 that extends through peripheral wall 16 and connects chamber 18 to outer surface of peripheral wall 16. Inner bladder 12 is preferably formed of two separate semi-sphere halves 17, 19 that are bonded together. It is possible, however, for inner bladder 12 to be formed of a unitary piece of material (not shown).

Outer layer 14 surrounds inner bladder 12 and covers outer surface of peripheral wall 16. Outer layer 14 includes access aperture 22, which extends through the entire thickness of outer layer 14 and is aligned with access opening 20.

Fill valve assembly 24 is located in hollow channel 23 that is created by access opening 20 and access aperture 22 and extends from outer surface of peripheral wall 16 to chamber 18. Fill valve assembly 24 is in fluid communication with chamber 18. Fill valve assembly 24 comprises inner flange 28 and outer flange 30 which are connected to each other. Inner flange 28 is embedded in peripheral wall 16. Outer flange 30 of fill valve assembly 24 is embedded or bonded into outer layer 14. It should be noted that other types of fill valve assemblies which are known in the industry may also be used within the scope of the present invention, provided a secure seal within pipeline sphere 10 is created. Fill valve assembly 24 is adapted to receive a fill valve (not shown) such as a Schraeder-type valve that is commonly used in the industry.

In the first embodiment of the present invention, illustrated in FIG. 2, pipeline sphere 10 comprises a single fill valve assembly 24. When inner bladder 12 is comprised of two separate semi-sphere halves, access opening 20 and fill valve assembly 24 are preferably spherically centered on one of the inner bladder hemi-spherical wall portions 17 or 19 (i.e. on the non-seamed side). If inner bladder 12 is a unitary piece, access opening 20 and fill valve assembly 24 may be located at any point on inner bladder 12. The use of a single fill valve assembly 24 is generally preferred for pipeline spheres 10 with an approximate overall diameter of less than 8 inches.

Figure 4:
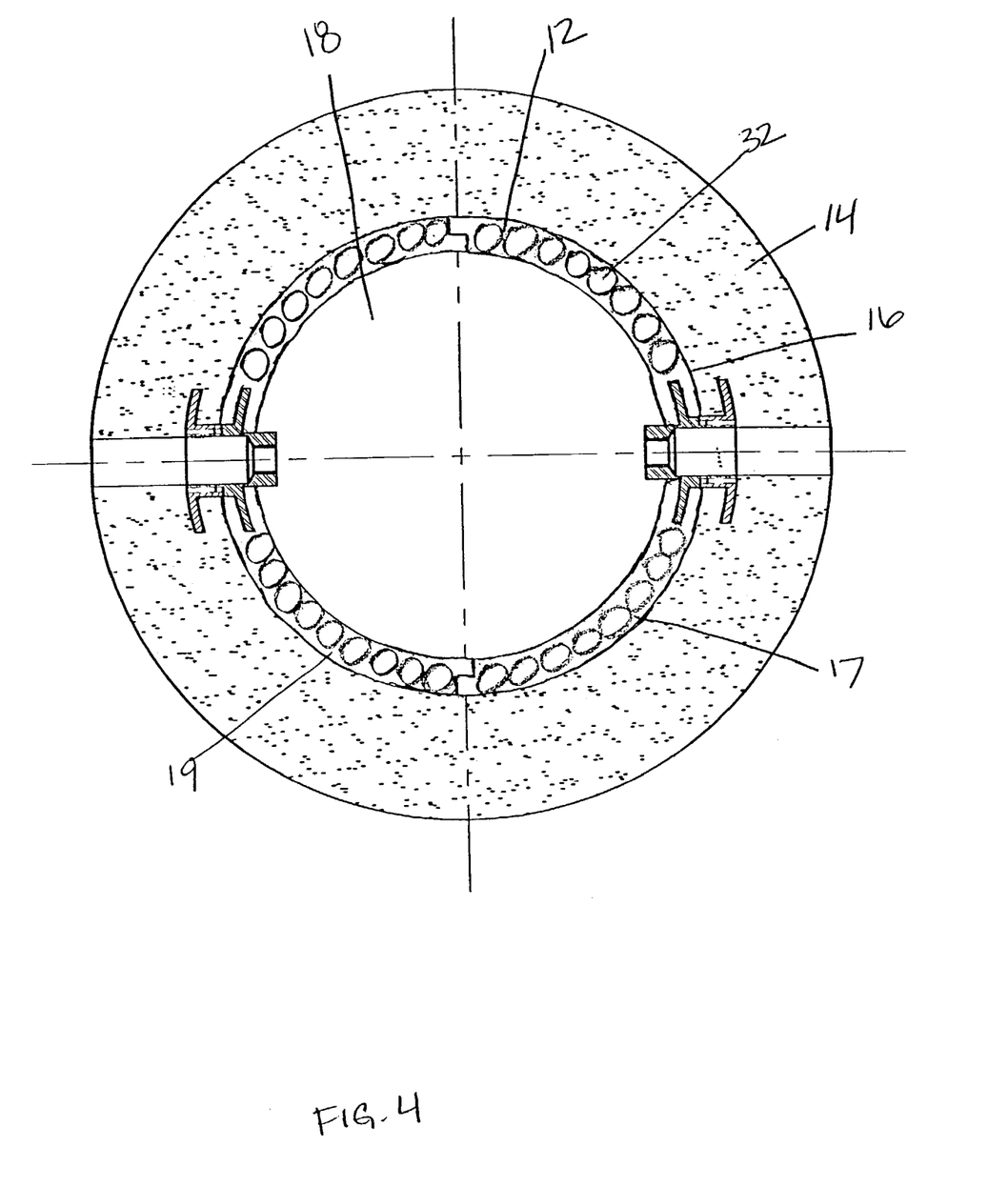
FIG. 4 is a cross sectional view of the pipeline sphere of FIG. 3, including weighted material.

As discussed previously, it is sometimes desired to weigh down the pipeline sphere 10 in the fluid product. Pipeline sphere 10 may be weighed down by adding a weighted material 32 to inner bladder 12 (FIG. 4). The weighted material 32 is preferably metal and more preferably lead shot which is encased or bonded into inner bladder 12. It should be noted that other types of metal, such as steel, could also be used to weigh down pipeline sphere 10, provided that the material had an adequate weight versus its size such that the amount necessary to reach the desired weight could be accommodated by inner bladder 12, and as long as the use of the weighted material selected was economically feasible.

The amount of weighted material 32 required to adequately fill inner bladder 12 will vary depending on the size of the pipeline sphere 10 and of the weighted material 32 itself. In general, a sufficient amount of weighted material 32 should be used such that it will completely and uniformly fill up inner bladder 12. If the weighted material 32 is too small, it will pack too tightly and inner bladder 12 will become too rigid. When utilizing lead shot as the weighted material, the preferred diameter of the lead shot for spheres having an overall size less than 20 inches is approximately 0.300 to 0.400 inches and more preferably approximately 0.350 inches. The preferred diameter of lead shot for spheres having an overall size of 20 inches and greater is approximately 0.450 to 0.550 inches and more preferably approximately 0.490 inches. It should be noted that other shapes of lead pieces or pellets, other than shot, could be used provided they adequately compact together to uniformly fill inner bladder 12.

The material from which inner bladder 12 is made should be flexible, yet durable. It is preferred that the material be a cured resinous material such as polyurethane, neoprene, or nitrol. Most preferably, inner bladder 12 is made of a polyurethane as this material is suitable for use with a wide variety of pipeline liquids, including crude oil, refined products, gasoline, jet fuel and diesel fuel. Preferred polyurethanes utilized can be TDI based (esters) or MDI based (ethers) polyurethane. The advantage of a TDI based polyurethane is that it cures at a faster rate, and is easier to handle. An MDI based polyurethane is more difficult to process and is also moisture sensitive, but is also more chemical and abrasion resistant. Inner bladder 12 is most preferably made of an MDI based polyurethane. Several satisfactory types of MDI based polyurethanes are commercially available, including Vibrathane™ which is manufactured by Uniroyal Chemical.

The material from which outer layer 14 is made should be flexible, yet durable. It is preferred that the material be a cured resinous material such as polyurethane, neoprene, or nitrol. Most preferably, outer layer 14 is made of a polyurethane as this material is suitable for use with a wide variety of pipeline liquids, including crude oil, refined products, gasoline, jet fuel and diesel fuel. Preferred polyurethanes utilized can be TDI based (esters) or MDI based (ethers) polyurethane. Most preferably, outer layer 14 is made of an MDI based polyurethane. It should be noted that inner bladder 12 and outer layer 14 may be made of the same or different material. In the preferred embodiment, however, both inner bladder 12 and outer layer 14 are made of an MDI based polyurethane.

The thickness of inner bladder 12 and outer layer 14 will vary depending on the size of pipeline sphere 10. In general, inner bladder 12 is thinner than outer layer 14. In smaller spheres (i.e. equal to or less than approximately 6 inches in overall diameter), inner bladder 12 is preferably between approximately 5/16 and 7/16 inches thick and most preferably approximately 3/8 inches thick. In medium spheres (i.e. between approximately 6 and 20 inches in overall diameter), inner bladder 12 is preferably between 7/16 and 5/8 inches thick and most preferably approximately 1/2 inches thick. In large spheres (i.e. equal to or greater than approximately 20 inches, and equal to or less than approximately 30 inches in overall diameter), inner bladder 12 is preferably between 5/8 and 7/8 inches thick and most preferably approximately 3/4 inches thick. In extra-large spheres (i.e. greater than 30 inches in overall diameter), inner bladder 12 is preferably between 7/8 and 1 1/8 inches thick and most preferably approximately 1 inch thick. The thicker inner bladder 12 of the larger spheres enables inner bladder 12 to become sufficiently rigid and retain its generally spherical shape.

The thickness of outer layer 14 falls within the middle of the range of spheres which are commercially available. In general, the thickness of outer layer 14 for a sphere having an approximate overall diameter less than 6 inches is approximately 3/4 to 1 1/8 inches and more preferably approximately 7/8 to 1 inch. The thickness of outer layer 14 for a sphere having an approximate overall diameter between 6 and 20 inches is approximately 1 3/8 to 1 5/8 inches and more preferably approximately 1 1/2 inches. The thickness of outer layer 14 for a sphere having an approximate overall diameter of 20 to 30 inches is approximately 1 7/8 to 2 1/8 inches and more preferably approximately 2 inches. The thickness of outer layer 14 for a sphere having an approximate overall diameter of more than 30 inches is approximately 2 3/4 to 4 1/4 inches and more preferably approximately 3 to 4 inches. This thickness enables outer layer 14 to be appropriately sized and to retain its flexibility while maintaining its generally spherical shape. If outer layer 14 is too thick, it will not allow for appropriate sizing because it will be too rigid. Conversely, if outer layer 14 is too thin, it will not maintain its generally spherical shape.

The total thickness of the spheres, including inner bladder 12 and outer layer 14, is preferably within the range of approximately 7/8 to 5 1/2 inches and more preferably within the range of 1 1/4 to 5 inches in thickness, depending on the overall diameter of the sphere. If the sphere is too thick, it will be too hard to swell up and properly size to fit the pipeline. If the sphere is too thin, it will not retain its generally spherical shape.

For example, a sphere having an overall diameter of approximately 4 inches is preferably between approximately 7/8 and 1 1/2 inches thick and most preferably approximately 1 1/4 inches thick, including inner bladder 12 and outer layer 14. A sphere having an overall diameter of approximately 8 to 10 inches is preferably between approximately 1 13/16 and 2 3/16 inches thick and most preferably approximately 2 inches thick, including inner bladder 12 and outer layer 14. A sphere having an overall diameter of approximately 20 inches is preferably between approximately 2 1/2 to 3 inches thick and most preferably approximately 2 3/4 inches thick, including inner bladder 12 and outer layer 14. A sphere having an overall diameter of approximately 30 inches is preferably between approximately 3 3/4 and 5 1/4 inches thick and most preferably approximately 4 to 5 inches thick, including inner bladder 12 and outer layer 14.

As shown in FIG. 3, a second embodiment comprises two fill valve assemblies 24, 26. As with the single fill valve assembly 24, a channel 23 is formed by access opening 20 and access aperture 22, which are aligned together. If inner bladder 12 is formed of two separate semi-sphere halves, access opening 20 and access aperture 22 are spherically centered within one of said halves 17, 19. The second fill valve assembly 26 is located directly opposite first fill valve assembly 24 on a common diameter of spherical peripheral wall 16. Second fill valve assembly 26 is received into access opening 20b and access aperture 22b which form channel 23b. The second embodiment is generally preferred for a pipeline sphere 10 with an approximate overall diameter of 8 inches or greater, to enable inner bladder 12 to be appropriately inflated and pipeline sphere 10 to be appropriately sized to fit a specific pipeline or meter prover.

The diameters of access opening 20, 20b and access aperture 22, 22b are preferably nearly identical and are sized to securely receive elongated fill valve assembly 24, 26. The diameters are preferably within the range of 3/8 to 1 inches and more preferably within the range of 9/16 to 13/16 inches.

Manufacture

A. Material

To begin the manufacturing process of the pipeline sphere 10 of the present invention, the material for inner bladder 12 and outer layer 14 should either be obtained in a pre-mixed state or mixed on-site. Mixing of the material can be done by hand or by machine. While numerous processing machines are commercially available and will adequately perform the necessary functions, the present invention utilizes a State Mix urethane processing machine, a standard machine purchased from State Mix, a division of State Industries. Utilization of a machine is preferred to hand-mixing as it is less time consuming and results in a higher quality starting material.

The components utilized for the inner bladder 12 and outer layer 14 material are based upon industry standards supplied by the chemical company for the specific material being utilized. For example, a supplier for TDI and MDI based polyurethane is Uniroyal Chemical. Uniroyal Chemical provides manufacturing (i.e. mixing and curing) specifications for a variety of desired densities (durometer). 50A is generally the softest material used for pipeline spheres and 75–85A is generally the hardest material used. A material that is less than 50A would normally break down too fast. Additionally, if the material were too soft, the detection switch in a meter proving system would not be properly activated. Conversely, a material that is more than 80A would normally be too hard for pipeline spheres because the spheres would not be able to pass through the pipe and seal up (the sphere needs to be able to flex slightly through the pipe). Industry standard formulas for 50 to 80 durometer material are well known and widely available and will not be recited herein. Although not particularly desirable for use in a meter proving system, materials having a durometer below 50 or above 80 are still within the scope of the present invention.

By way of example only, the standard formula for obtaining a 55A MDI based polyurethane material, as provided by Uniroyal Chemical, comprises mixing the following components, listed by percentage in pounds: 63.75 of 6020 pre-polymer; 6.37 of Benzoflex; 1.68 of 1.4 Butane-diol (BD); and 28.2 of Vibracurae (A125). The addition of a catalyst to set the material faster is also optional, and is preferred when utilizing a machine to mix the material in order to speed up the manufacturing process. When mixing by hand, a catalyst may not be preferred because the mold needs to be filled before the material begins to set. A preferred catalyst is Niox A-33, although other catalysts compatible with the specific material being used may also be utilized. The preferred amount of catalyst to be used is quite small—about 8 cc/30 pounds curative (wherein the curative is only approximately 28% of the total product). This amount may vary depending on manufacturer specifications.

The processing machine is programmed to meter the appropriate amount of each component and to introduce it into the mixture at the appropriate temperature and time. For example, while Benzoflex does not need to be combined with the mixture at a very warm temperature, A125 needs to be heated close to the mold temperature prior to combination into the mixture. Again, these standard manufacturing specifications are obtained from the chemical manufacturer and are either generally known or generally available in the industry.

Optionally, liquid Teflon may be added to the starting material to reduce friction. Specific colors may also be added to the material in order to assist in separating and identifying different products by durometer, size, or any other desired variable.

Once all components have been added to the mixture, the processing machine mixes the material according to manufacturer specifications. Typically, and by way of example only, for 55A Vibrathane™, the mixture is mixed for approximately 1 to 2 hours in the machine tank using slow agitation. The material is then heated to manufacturer specifications and the material is de-gassed. For 55A Vibrathane™, the material is heated to approximately 160 to 170 degrees Fahrenheit prior to introduction into the mold.

If the material is being mixed by hand, the manufacturer specifications discussed above, as well as techniques commonly known in the industry, are followed. Generally, however, when mixing 55A Vibrathane™, it is preferable to place the A125 component in an oven in 5-gallon tubs to heat to the appropriate temperature. The 6020 pre-polymer and Benzoflex are mixed together by weight. Any desired color is then added to the mixture. The entire mixture is then placed inside a vacuum chamber to be de-gassed. The entire mixture is next warmed to the appropriate temperature, according to manufacturer specifications, and the A125 and BD components are combined into the mixture, along with any desired catalyst. The entire mixture is then mixed again and de-gassed. When utilizing a MDI based polyurethane, it is preferable to maintain a humidity level below 50% as MDI based polyurethane is generally moisture sensitive.

B. Inner Bladder Mold

The inner bladder and outer layer molds of the present invention were specially made, however, it is submitted that other commercially available molds of the same general shape as herein described could be utilized or that molds could be specifically made for that purpose. Thus, although the specially-made inner bladder and outer layer molds will herein be described, it is noted that the use of other molds of the same general shape would also fall within the scope of the present invention.

The inner bladder mold comprises two separate pieces. The first piece presents a concave shaped interior. The exterior of the first piece may be of any general shape but is preferably cylindrical to reduce the amount of material used to make the mold and to reduce the weight of the mold. The second piece of the mold presents a convex shaped exterior which is received inside the interior of the first concave shaped piece. The second piece is preferably solid, but could also be hollow or entirely convex shaped. The mold comprises means, such as screws, clamps, latches or the like, for removably securing the second piece of the mold to the first piece of the mold. The first piece of the mold preferably has attached legs or other means for maintaining a position slightly above the work surface for ease of lifting and moving. The molds may be of various sizes to accommodate customer preference. The diameter of the second piece of the mold is preferably smaller than the diameter of the first piece of the mold, depending on the overall size of the pipeline sphere 10, as discussed above. The molds are preferably made of aluminum for ease of handling, heating and economic feasibility.

C. Molding of Inner Bladder

The first piece of the inner bladder mold is adapted to receive inner flange 28 of fill valve assembly 24 in the center of the concave portion of the inner bladder mold, wherein inner flange 28 of fill valve assembly 24 is spherically centered in the molded piece. Inner flange 28 preferably contains apertures to assist in the bonding of inner flange 28 to the polyurethane or other composite material. The convex portion of the inner bladder mold is secured into the concave portion of the mold by screws, clamps, or other removable securing means, prior to adding the composite material mixture. The entire mold is preferably warmed in an oven to the approximate temperature of the material mixture. For 55A Vibrathane™, the approximate desired temperature is 160 to 180 degrees Fahrenheit and more preferably approximately 170 degrees Fahrenheit. Of course, manufacturer specifications for the specific composite material being used should be followed.

Regardless of whether the material is mixed by hand or machine, the composite mixture is transferred into the inner bladder mold, by pouring, injecting or other methods commonly known in the industry. The preferred method of transfer is by pouring. For ease of pouring and to keep bubbles out of the mixture, a flexible hose is preferably used to pour the composite material mixture into the concave portion of the inner bladder mold. The use of a flexible hose, however, is not necessary. Composite material is poured into the inner bladder mold to mold capacity. Two molds need to be filled and cured to create one complete inner bladder 12. Depending on the size of the sphere, each of the two molds may accommodate fill valve assemblies 24, 26 or only one of the molds may accommodate single fill valve assembly 24. Of course, is inner bladder 12 is being made as a unitary piece, only one mold will be required.

If desired, a weighted material can be added to the composite material in the inner bladder mold at this point, prior to curing of the inner bladder mold. Weighted material 32, such as lead shot, is poured into each side of the mold to displace excess composite material. The amount of weighted material 32 added is sufficient to completely fill each side of the inner bladder mold provided that the material is not compacted so tightly that there is no composite material between the pieces of weighted material. Composite material is preferred between the pieces of weighted material in order to allow for expansion. It is preferable that the lead shot or other weighted material not be cleaned prior to placement into the composite material. Cleaning solvents tend to break down certain composite materials, such as polyurethane, which reduces the integrity of inner bladder 12.

After the inner bladder mold is filled and, if added, after the weighted material is in place, one of a pair of rings is placed onto the outer edge of the inner bladder mold, preferably resting mainly on the first piece of the mold. The pair of rings consists of a male and a female lip which fit together and which form lips on the top of each mold such that when cured, the two inner bladder semi-spheres can be mated together. After the ring is placed onto the inner bladder mold, a heat source such as a torch is preferably used to burn off air bubbles from the material. Two inner bladder molds, one with a male ring and one with a female ring are necessary to create a complete inner bladder 12. Two separate molds may be used, each molded using a ring that is notched differently, or one mold may be poured and cured at a time—although this option is slower.

Once the inner bladder mold(s) have been poured, the mold(s) are placed in an oven to cure for approximately 1½–2 hours, following manufacturer specifications, for example for 55A Vibrathane™. The temperature of the oven will be selected according to manufacturer specifications, however, the preferred temperature for 55A Vibrathane™ is between approximately 160 and 180 degrees Fahrenheit and more preferably approximately 170 degrees Fahrenheit. Of course, it should be noted that other methods of curing which are either known in the industry or suggested by the manufacturer may be utilized and are within the scope of this invention.

After each inner bladder mold half has cured, the two halves of the inner bladder (each with a different notched ring) are secured together. Securing of the two pieces together is preferably accomplished by bonding the halves together, although other methods of securing such as gluing are acceptable. The bonding material utilized is preferably the same material as that forming the inner bladder itself. The bonding material, however, preferably has a slightly harder durometer than that of the inner bladder. The inner bladder mold halves are removed from the oven or curing facility and the notched rings are removed to expose the cured inner bladder material. The bonding material is poured onto the groove of the molded ring of the first inner bladder half. The second inner bladder half is removed from its inner bladder mold and is then set on top of the first inner bladder half, which preferably remains in the mold for stability. The two inner bladder halves are then properly aligned. The complete inner bladder 12 is cured according to manufacturer specifications.

Once the seam has cured, the complete inner bladder 12 is removed from the mold. The seam is then cleaned up, preferably by cutting off any excess material and grinding the seam in order to ensure a secure fit within outer layer 14. The seam is then preferably, although not necessarily, hand tested to ensure its integrity.

At this point, outer flange 30 of fill valve assembly 24 or 26 is connected to one or both inner flanges 28, depending on whether inner bladder 12 was made with single fill valve assembly 24 or dual fill valve assemblies 24, 26. Outer flange 30 preferably contains apertures to assist in bonding to the polyurethane or other composite material. Outer flange 30 is also preferably sandblasted prior to connection to inner flange 28 to assist the polyurethane, or other composite material, in adhering to said outer flange 30. An adhesive primer, such as Conap AD-1146-C-1 manufactured by Cytec, is also preferably applied to outer flange 30 and cured at a temperature of approximately 160 to 180 degrees Fahrenheit prior to connection to inner flange 28, to assist in the bonding of outer layer 14 to outer flange 30. Other adhesive primers commonly known in the industry may also be used.

A holding pin is removably secured into each fill valve assembly 24, 26 in order to create access aperture 22, 22b in outer layer 14 and assist in supporting inner bladder 12 in the center of outer layer mold. A mold release, such as Ease Release 2910-S manufactured by Mann Formulated Products, is preferably coated onto the exterior of inner bladder 12 so that inner bladder 12 does not bond to outer layer 14, which may result in the rupture of inner bladder 12 seam. Other mold release products commonly known in the industry may also be used. Care should be taken to ensure that any mold release utilized is not applied on outer flange 30. The complete inner bladder 12 with holding pin(s) is preferably warmed back up to the manufacturer specifications.

D. Outer Layer Mold

The outer layer mold preferably comprises two separate pieces, each with a concave interior and forming a generally spherical cavity when secured together. The exterior of outer layer mold may be of any general shape but is preferably cylindrical to reduce the amount of material and weight of the mold. The outer layer mold pieces are removably secured to each other, preferably with latches, clamps, screws, or other similar means. The open end of each outer layer mold piece has one or two grooves to receive holding pins inserted into fill valve assemblies 24, 26 depending on whether inner bladder 12 comprises single fill valve assembly 24 or dual fill valve assemblies 24, 26. These grooves form apertures when the pieces of the outer layer mold are secured together. If two grooves are present, they are directly opposite each other on a common diameter of the spherical wall.

The complete, cured inner bladder 12 is set inside the first outer layer mold piece, wherein the holding pin(s) are set in the groove(s) in the outer mold to center inner bladder 12. The second outer layer mold piece is then set on top of the first piece with the grooves aligned. The two outer layer mold pieces are latched or otherwise secured together. Outer layer mold also comprises an aperture in the top of the second piece of the mold, preferably containing a plug, which allows for the composite material to be poured into the mold and then for the mold to be sealed.

E. Molding of Outer Layer

If a material that is different from the inner bladder material is being used for the outer layer, the material is mixed or otherwise obtained as described above with respect to the inner bladder material.

The outer layer mold is then filled through the hole in the top of the second outer layer mold piece with the outer layer material. The material is poured around inner bladder 12, resulting in a seamless outer layer 14.

The outer layer mold temperature, as well as the complete inner bladder 12 and fittings 24, 26 should be that recommended by the manufacturer. If the mold is too cold, cold mold marks will be made and the urethane will pull away from the mold, inner bladder 12, or fittings 24, 26. If the mold is too hot, it is hard to handle. When utilizing 55A Vibrathane™ the preferred temperature for the outer layer mold is 210–220 degrees, preferably 220. Once the outer layer material is poured into the mold, the plug is inserted and secured into the aperture in the top of the mold to maintain the internal pressure in the mold so the material does not swell outside of the mold during curing. The amount of material necessary to fill the mold depends on the size of the sphere being manufactured. Regardless, the mold is filled to capacity.

Air bubbles are then evacuated from the outer layer, preferably by spinning the mold on the turn table to pull the bubbles inward and out through the aperture in the top of the mold. The mold is preferably spun for approximately 15 minutes as fast as possible while keeping the mold balanced. It should be noted that other air evacuation methods known in the industry may also be used.

The outer layer mold is then cured pursuant to manufacturer specifications. The approximate cure time is 4 to 5 hours for 55A Vibrathane™ at a preferred temperature of approximately 230 to 240 degrees Fahrenheit, and more preferably at a temperature of approximately 235 degrees Fahrenheit. The mold is removed from the oven or curing facility and allowed to cool preferably for at least 30 minutes to 1 hour. The completed sphere is then removed from the outer layer mold and the holding pins removed.

The completed sphere is preferably cured for an additional amount of time. In the preferred method, a ¼ inch rod is inserted through the fill valve assemblies 24, 26 of the sphere and the sphere is suspended in the air. If only a single fill valve assembly 24 is present, the rod is preferably inserted into the sphere and the sphere is suspended in the air on only one side. The sphere is preferably post-cured for an additional 24 hours or more at approximately 120 degrees.

The top plug containing the evacuated air bubbles is then separated from the sphere and the revealed surface is smoothed. The sphere is then preferably tested for roundness and integrity by swelling the sphere up to 4–5% bigger than its intended use in the field.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and sub-combinations. This is contemplated by and is within the scope of the claims.

The invention claimed is:

1. A pipeline sphere assembly comprising:
   an inflatable inner bladder structure formed of polyurethane including a generally spherical peripheral wall comprising two joined hemispherical wall portions and defining a hollow chamber and presenting a generally spherical outer surface, and an access opening through said wall;
   a flexible, expandable, resilient seamless outer layer formed of polyurethane covering said outer surface, said outer layer including an access aperture aligned with said opening; and
   an elongated fill valve element disposed in said opening and extending from said outer surface into said aperture, said fill valve element providing a hollow channel that is in fluid communication with said chamber, wherein said elongated fill valve element includes an inner flange that is embedded in a portion of said spherical peripheral wall that surround said opening and includes an outer flange that is embedded in a portion of said outer layer that surrounds said aperture.

2. The pipeline sphere assembly of claim 1, further comprising a second elongated fill valve element.

3. The pipeline sphere assembly of claim 1, wherein said inner bladder structure contains no added weighted material.

4. The pipeline sphere assembly of claim 1, wherein said inner bladder structure contains a weighted material.

5. The pipeline sphere assembly of claim 4, further comprising a second elongated fill valve element.

6. The pipeline sphere assembly of claim 1, wherein said inner bladder structure contains lead shot embedded into said polyurethane material.

7. The pipeline sphere assembly of claim 6, further comprising a second elongated fill valve element.

\* \* \* \* \*